US 7,966,558 B2

(12) United States Patent
Duncan et al.

(10) Patent No.: US 7,966,558 B2
(45) Date of Patent: Jun. 21, 2011

(54) SNIPPING TOOL

(75) Inventors: Richard J Duncan, Kirkland, WA (US); Neils van Dongen, Seattle, WA (US); Constance A Missimer, Seattle, WA (US); Sally Liu, Seattle, WA (US); Khalil Jabrane, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 11/424,298

(22) Filed: Jun. 15, 2006

(65) Prior Publication Data

US 2007/0294630 A1 Dec. 20, 2007

(51) Int. Cl.
*G06F 17/00* (2006.01)
*G06F 3/00* (2006.01)
*G06K 7/00* (2006.01)
*G06K 7/10* (2006.01)

(52) U.S. Cl. ........ 715/243; 715/246; 715/247; 715/255; 715/700; 382/312; 382/321

(58) Field of Classification Search .................. 715/243, 715/253, 230, 255, 272, 273, 277, 246, 247, 715/700; 382/312, 321
See application file for complete search history.

(56) References Cited

U.S. PATENT DOCUMENTS

| | | | |
|---|---|---|---|
| 5,063,600 A | 11/1991 | Norwood | |
| 5,157,768 A * | 10/1992 | Hoeber et al. | 715/711 |
| 5,687,259 A | 11/1997 | Linford | |
| 5,689,717 A | 11/1997 | Pritt | |
| 5,893,126 A * | 4/1999 | Drews et al. | 715/203 |
| 5,926,633 A * | 7/1999 | Takagi et al. | 345/619 |
| 5,978,523 A | 11/1999 | Linford | |
| 6,081,611 A | 6/2000 | Linford | |
| 6,584,479 B2 | 6/2003 | Chang | |
| 6,587,895 B1 * | 7/2003 | Golovchinsky et al. | 710/12 |
| 6,687,878 B1 | 2/2004 | Eintracht | |
| 7,315,848 B2 * | 1/2008 | Pearse et al. | 707/1 |
| 2003/0070176 A1 * | 4/2003 | Parker et al. | 725/105 |
| 2004/0019611 A1 | 1/2004 | Pearse | |
| 2004/0119762 A1 * | 6/2004 | Denoue et al. | 345/863 |
| 2004/0148591 A1 | 7/2004 | Kumhyr | |
| 2004/0177324 A1 * | 9/2004 | Simmons et al. | 715/530 |
| 2004/0203589 A1 * | 10/2004 | Wang et al. | 455/410 |
| 2004/0205200 A1 | 10/2004 | Kothari | |
| 2005/0044106 A1 * | 2/2005 | Duncan et al. | 707/104.1 |
| 2006/0005151 A1 * | 1/2006 | Altman | 715/860 |
| 2006/0026152 A1 | 2/2006 | Zeng | |
| 2006/0048058 A1 * | 3/2006 | O'Neal et al. | 715/730 |
| 2006/0161624 A1 * | 7/2006 | Montgomery et al. | 709/204 |
| 2006/0277460 A1 * | 12/2006 | Forstall et al. | 715/513 |
| 2007/0094321 A1 * | 4/2007 | Nussey et al. | 709/200 |
| 2007/0162865 A1 * | 7/2007 | Haynes et al. | 715/769 |

OTHER PUBLICATIONS

Microsoft Ships Consumer-Friendly Add-ons for Tablet PC, http://www.activewin.com/awin/comments.asp? HeadlineIndex=28910, Mar. 21, 2006, pp. 1-4.

(Continued)

*Primary Examiner* — Chau Nguyen

(74) *Attorney, Agent, or Firm* — Lee & Hayes, PLLC

(57) ABSTRACT

Systems and methods for capturing content and performing operations associated with the content are described. A stylus or other pointing device may be used designate content to be captured. After content is designated, a new window is generated that includes the designated content and user interface elements for annotating, conveying or otherwise acting upon the designated content.

19 Claims, 4 Drawing Sheets

OTHER PUBLICATIONS

Windows Vista Feb CTP (Build 5308), http://randomelements.me.uk/Articles/Lists/Articles/DispForm.aspxZ?ID=5, Mar. 21, 2006, 10 pages.

ATPM, http://www.dd.se/Tips/atpmfiler/ATPM-1012-print.pdf, vol. 10, No. 12, Dec. 2004, pp. 1-57.

* cited by examiner

SNIPPING TOOL

BACKGROUND

People often rely on graphical representations more than textual representations of information. They would rather look at a picture than a block of text that may be equivalent to the picture. For instance, a home owner may cut out pictures of magazines to show contractors exactly what is desired when remodeling a kitchen or bathroom. Textual representations of the same material often fall short. The tool that the home owner may use is no more complex than a pair of scissors.

In the computing world, however, attempting to capture and convey the identical content can be cumbersome. Typical computer systems provided limited ability to capture and convey graphically intensive content. Rather, they are optimized for capturing and rendering text or do not provide user friendly interfaces for capturing and conveying images.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

The options available to users of computer systems for capturing and conveying content displayed on display devices are limited. Capturing and conveying displayed content remains difficult and cumbersome

SUMMARY

Aspects of the invention relate to methods and systems for capturing and conveying content displayed on display devices using a snipping tool. Content may be designated with a stylus, mouse or other selection device. After the content is designated, a window is generated that includes the designated content and one or more menu options. The menu options may allow a user to perform operations such as annotating and conveying the designated content. The snipping tool allows users to capture a screen shot of any object displayed on a display device and then annotate, save, or share the screen shot.

Furthermore, a computer-readable medium storing computer-executable instructions for performing aspects of the invention is disclosed. The computer-readable instructions may exist at one or more levels of the computing system, e.g., device driver level, operating system level, application level, or others.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the invention are illustrated by way of example and not limited in the accompanying figures in which like reference numerals indicate similar elements and in which.

DETAILED DESCRIPTION

Figure 1:
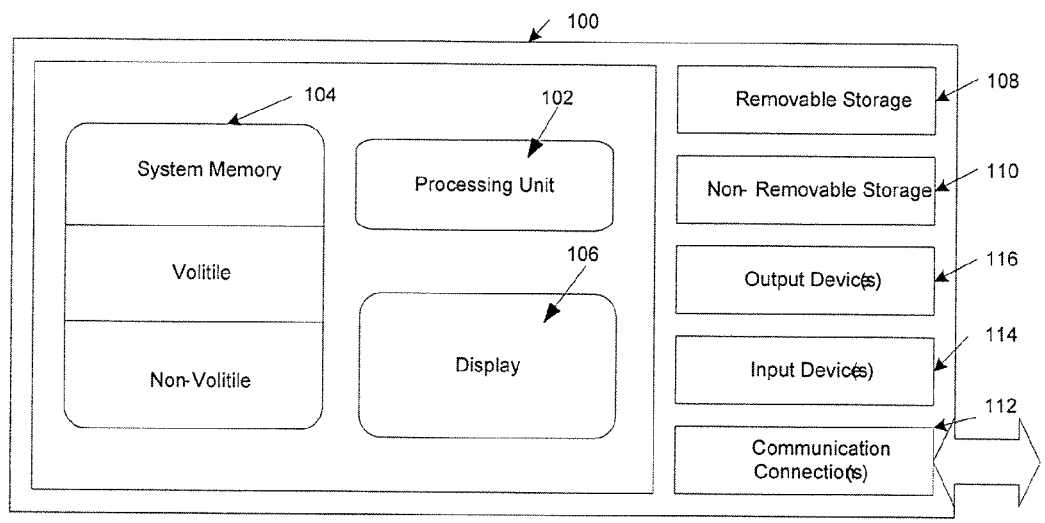
FIG. 1 is an illustrative computing environment that may be used to implement aspects of the invention.

FIG. 1 illustrates an exemplary computer device 100 that may be used to implement aspects of the invention. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and non-volatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, stylus, voice input device, touch input device, touchscreen device, interactive display device, etc. Output device(s) 116 such as a speakers, printer, etc. may also be included. One example of an output device is a display device 106. Display device 106 may be implemented with a cathode ray tube (CRT), liquid crystal display, light emitting diode display or other conventional display devices. Display devices 106 may be used to present content such as graphical user interfaces, data and windows to users. As one skilled in the art will appreciate, a window is viewable area that may include graphical user interface elements and may be used to display data.

Figure 2:
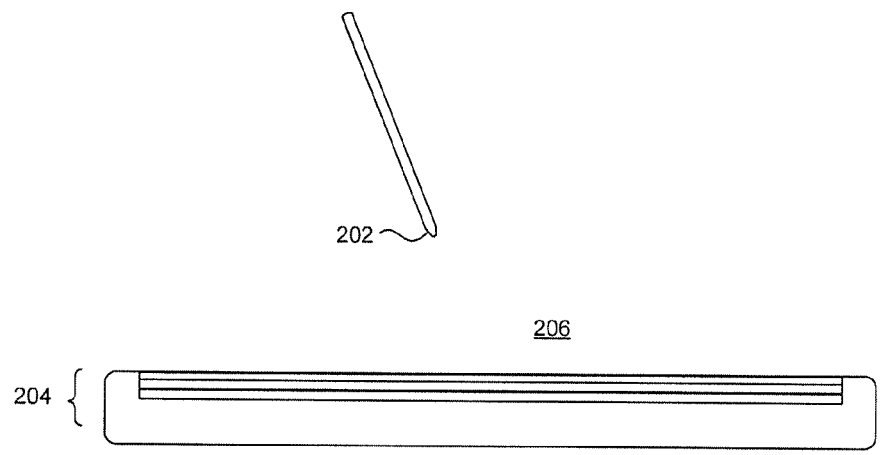
FIG. 2 is an illustrative computing device that includes an interactive display device screen that may be used to implement aspects of the invention.

FIG. 2 depicts an illustrative tablet PC 206 that can be used in accordance with various aspects of the invention. Any or all of the features, subsystems, and functions in the system of FIG. 1 can be included in tablet PC 206. Tablet PC 206 includes a large display surface 204, e.g., a digitizing flat panel display, such as a liquid crystal display (LCD) screen. Using stylus 202, a user can designate content, select, highlight, and/or write on the interactive display device screen 204. Additionally, in some embodiments, a user's own finger(s) could be the stylus 202 and used for selecting or indicating portions of the displayed image on a touch-sensitive or proximity-sensitive digitizing display surface 204. Examples of suitable digitizing display surfaces 204 include electromagnetic pen digitizers, such as Mutoh or Wacom pen digitizers. Other types of digitizers, e.g., optical digitizers and capacitive digitizers, may also be used. Tablet PC 206 interprets gestures made using stylus 202 or the user's hand in order to, among other things, manipulate data, enter text, create drawings, perform preconfigured operations, and/or execute conventional computer application tasks such as spreadsheets, word processing programs, and the like.

Figure 3:
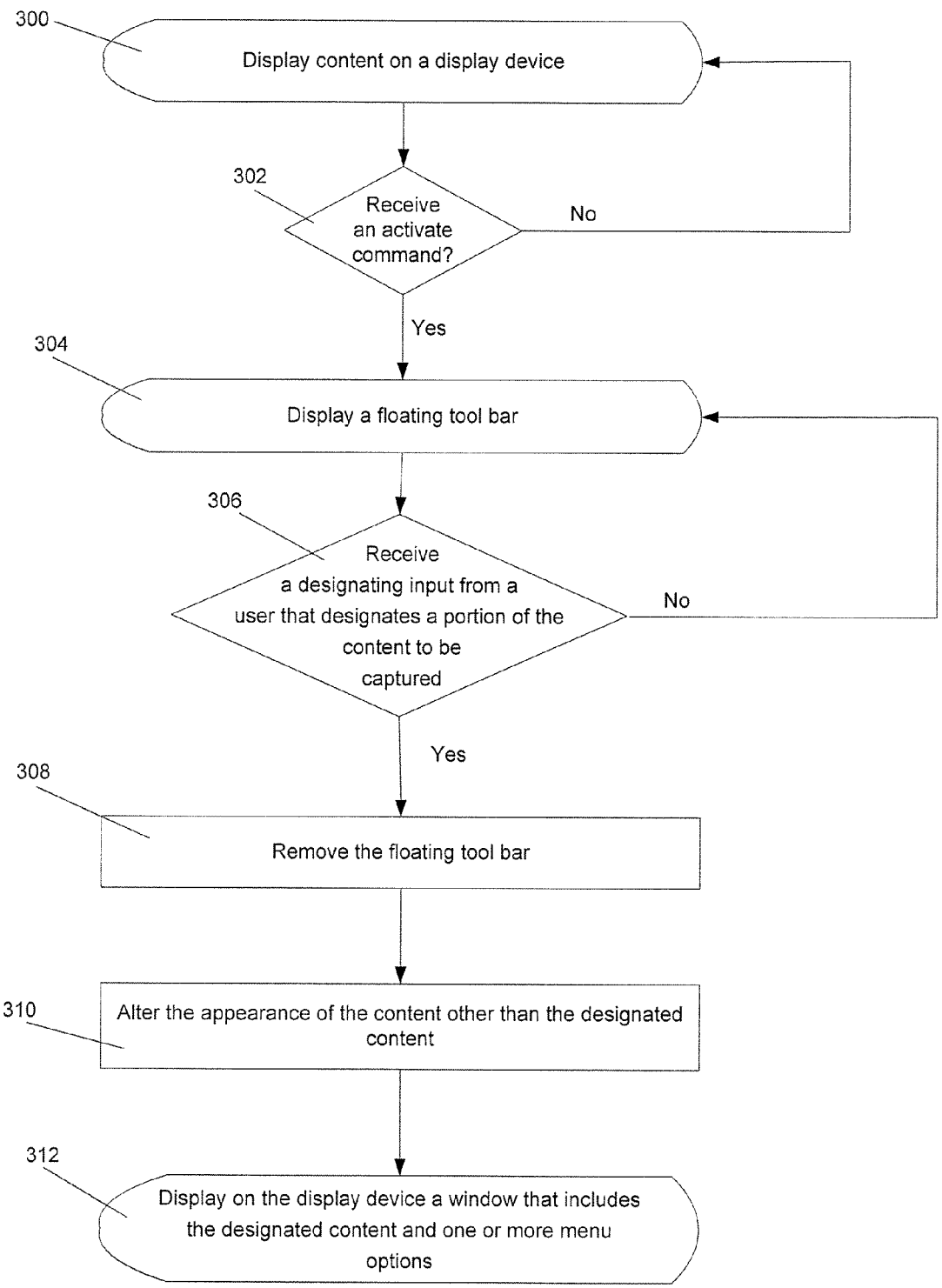
FIG. 3 illustrates a computer implemented method for capturing and conveying content in accordance with an embodiment of the invention.

FIG. 3 illustrates a computer implemented method for capturing and conveying content in accordance with an embodiment of the invention. First, in step 300 content is displayed on a display device. The content may include text, images or any other type of content that may be displayed on a typical computer display device, such as display device 106 (shown in FIG. 1).

In step 302 it determined whether or not an activate command has been received. The activate command may be received from a user and may indicate that the user desires to use a snipping tool. The activate command may be pressing a special key combination, such as Windows+PrtScn, or by the user clicking on an icon in the quicklaunch tray, or by clicking on an icon on the start menu. When no activate command is received, control returns to step 300, where the process waits for the receipt of an activate command. When an activate command is received, in step 304 a floating toolbar may be displayed on the display device. The floating toolbar may be an uppermost window such that it will not be covered by any other windows. The floating toolbar may include menu options relating to the designation of content to capture.

Figure 4:
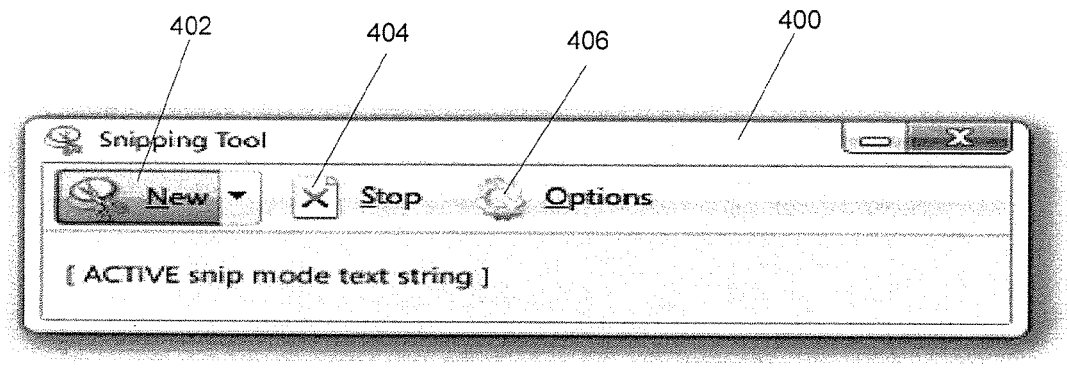
FIG. 4 illustrates an exemplary floating toolbar, in accordance with an embodiment of the invention.
Figure 4A:
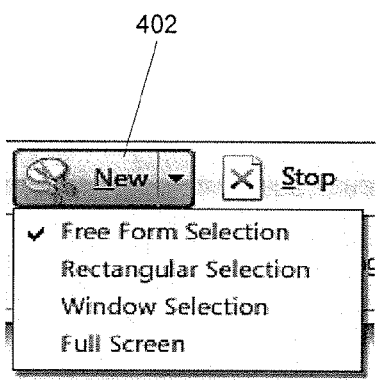
FIG. 4a illustrates an exemplary snippet tool menu, in accordance with an embodiment of the invention.

FIG. 4 illustrates an exemplary floating toolbar 400 in accordance with an embodiment of the invention. Floating toolbar 400 includes a selection menu element 402, a stop menu element 404 for returning to a passive or non-capturing state and an options menu element 406 for configuring the toolbar. Selection menu element 402 is in the form of a drop-down menu that allows users to indicate the type of snipping tool desired. For example, as shown in FIG. 4a, selection menu element 402 may include a drop menu with elements such as free form selection, rectangular selection, window selection and full screen. In one embodiment, when free form selection is selected, the computer device may be configured to convert a received stroke array into a points array and then create a region based on the points array. In another embodiment, the user may hover over an icon, such as an icon included on a taskbar, that corresponds to a window that will be selected.

The type of snipping tool generated may be a function of the selection made by the user. In one embodiment of the invention, a default type of snipping tool may be a function of the type of computer device. For example, a Tablet PC computer device may have a default setting of free form, while other computer devices may use rectangular selection as a default.

Returning in FIG. 3, in step 306 it is determined if a designating input is received from a user. A designating input designates a portion of the content to be captured. For example, after indicating that the user desires to use a free form snipping tool, a user may contact a digitizing display surface, such as digitizing display surface tool 204 (shown in FIG. 2) with stylus 202 or use a mouse and begin to create a free form shape that designates a portion of the displayed content the user wishes to capture.

When a designating input is not received, the process returns to step 304 and waits for the receipt of an input. When a designating input is received in step 306, in step 308 the floating toolbar may be removed. In one embodiment of the invention, the floating toolbar is removed as soon as a user begins to designate a portion of content to capture. For example, the floating toolbar may be removed as soon as a stylus contacts a digitizing display surface. In another embodiment of the invention, the floating toolbar is not removed until content has been designated.

Next, in step 310 the appearance of the content other than the designated content may be altered. Altering the non-designated content may be used to draw attention to the designated content. In one embodiment of the invention, a white overlay may be applied to the non-designated content. Of course, other alterations may be made to the designated and/or non-designated content to draw attention to the designated content. Alterations may include changing color content to black and white content, changing brightness of content, or applying a variety of overlays.

Figure 5:
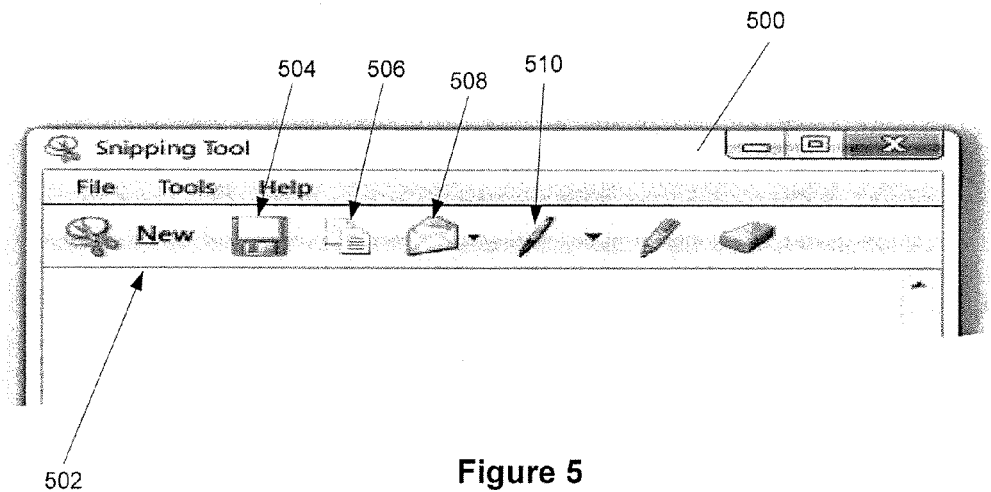
FIG. 5 illustrates an exemplary window that may be placed around designated content, in accordance with an embodiment of the invention.

After the user designates content, in step 312 a window that includes the designated content is displayed on the display device. The window may include one or more menu options that allow the user to annotate and convey the designated content. FIG. 5 illustrates an exemplary window 500 that may be placed around designated content in accordance with an embodiment of the invention. A new menu 502 may be used to return control to the floating toolbar. A save icon 504 may be selected to save the designated content and any annotations to a folder, external storage device or any other storage location. The designated content may be saved in JPEG, bitmap, HTML or other conventional file formats. In one embodiment of the invention, at least a portion of the designated content may be saved as text to facilitate later editing.

In one embodiment of the invention, HTML content is saved such that the hyperlinks included within the HTML content are preserved. When the user designates content inside of a web browser window, it may be desirable to preserve the context of the webpage URL that the user is currently viewing. This context will be included when the user saves captured content to formats that support additional information, such as HTML, or when the user sends the captured content as an email message. This context can be included along with the captured content in the form of a hyperlink to the page that the user was viewing at the time of capture. The snipping tool can communicate with the web browser to obtain the URL information. In one embodiment, this communication can use APIs specific to the web browser in question, for example, the Internet Explorer Document Object Model (DOM). In another embodiment, active accessibility may be used. For an application to support active accessibility, the application must provide all of its on-screen content as a tree of textual information. Each node on the tree will have certain attributes, such as an accessibility role (text box, button, combination box, etc.), name, value and description. The tree can be searched using a link fingerprint. Applications will define link fingerprints that can be used by a snipping tool to find the URLs within the trees. In operation, URLs may be located by walking the tree until a node is found that satisfies all of the conditions specified in the link fingerprint. Link fingerprints may be identified by software vendors and added to an operating system registry, for example during installation.

A copy icon 506 may be used to copy the contents of window 500 to a clipboard or other memory. In some embodiments, the contents of window 500 are automatically copied to the clipboard and the clipboard contents are updated when modifications are made to the contents of window 500. An e-mail icon 508 may be used to e-mail the content included within window 500. The e-mail message may include the content as an attachment or in-line. In one embodiment of the invention, annotations made by a user are parsed in a conventional manner and the parsed annotations are used to populate the subject line of the e-mail message. The parsed annotations may also be used to name a file that will be saved or as an information tag associated with the image. In another embodiment of the invention, a title of a web page identified in the designated content is used to populate the subject line of the e-mail message. In other embodiments of the invention a title of window 500 may be used to populate the subject line of an e-mail message.

A pen icon 510 may be used to annotate the content displayed in window 500. For example, a user may wish to use a stylus to write notes and draw arrows to particular parts of the content included within window 500. One skilled in the art will appreciate that many different additional and/or alternate menu elements may be used to allow users to annotate, convey or otherwise operate on the content included within window 500. For example, an extensible Send To option may be provided that, when selected, sends the content included within window 500 to one or more editing applications. Toolbars of applications may also include at least some of the menu elements described above. For example, a browser application may include a selection menu element, such as selection menu element 402 (shown in FIG. 4), so that a snip can be initiated directly from a browsing window.

In some embodiments of the invention, window 500 is located and sized such that the content displayed within window 500 corresponds to the location and size of the designated content. That is, window 500 appears to be generated around the designated content, such as by fading into view, without the designated content changing size or location. Such positioning preserves the context of the surrounding content. When the designated content is located at an edge of a display, window 500 may be shifted to allow for room to insert annotations.

The size of window 500 may be expanded, such as to provide additional room for annotations. In one embodiment of the invention, the location and size of content displayed within window 500 remains stationary while the size of window 500 expands. Window 500 may be resized by a computer device to provide additional room for annotations. For example, when a user annotates content and the annotation approaches an edge of the window, the computer device may expand the window to provide additional room for annotations.

Figure 6:
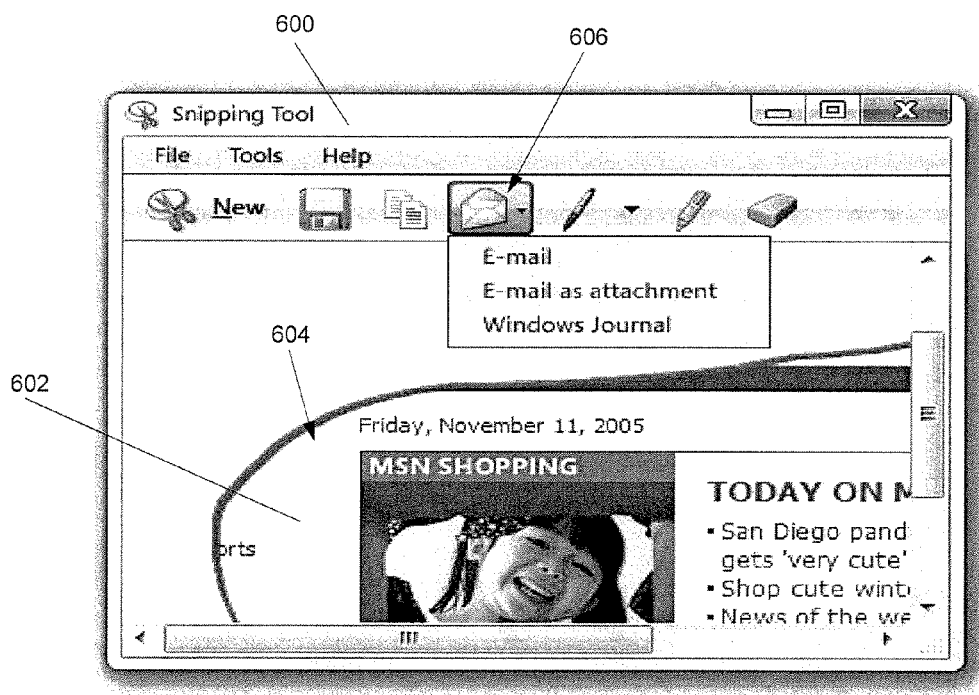
FIG. 6 illustrates a window that includes content that has been designated by a user using a free form snipping tool, in accordance with an embodiment of the invention.

FIG. 6 illustrates a window 600 including content 602 that has been designated by a user using a free form snipping tool, in accordance with an embodiment of the invention. In the embodiment shown, content 602 is surrounded by a border 604. Border 604 may correspond to a free form pattern created by a user. An e-mail icon 606 has been selected to e-mail the content included within window 600.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A computer-implemented method for capturing content displayed on a display device, the method comprising:
   displaying content in a first window on a display device;
   receiving a designation input including a free form shape that designates a portion of the content to be captured; and
   in response to receiving the designation input, displaying on the display device a new window in addition to the first window, the new window including the portion of the content designated by the free form shape of the designation input and at least one conveyance menu option.

2. The computer-implemented method of claim 1, wherein the at least one conveyance menu option includes a menu option for creating an email message.

3. The computer-implemented method of claim 1, wherein the at least one conveyance menu option includes a menu option for saving the designated content to a computer-readable medium.

4. The computer-implemented method of claim 1, further including receiving annotation content from a user and including the annotation content in the new window.

5. The computer-implemented method of claim 4, wherein the annotation content comprises a handwritten note.

6. The computer-implemented method of claim 1, wherein the new window is positioned so that the content designated by the free form shape of the designation input is located in the same position on the display device as it was when it was displayed on the display device to provide context to the content designated by the free form shape of the designation input.

7. The computer-implemented method of claim 6, further including:
   in response to a command from a user, resizing the new window without changing the location or size of the designated content.

8. The computer-implemented method of claim 1, further comprising displaying a floating toolbar on the display device in addition to the content in response to receiving an activate command, the activate command indicating a request to use a snipping tool.

9. The computer-implemented method of claim 1, further comprising automatically copying the content designated by the free form shape of the designation input to a clipboard to produce clipboard content.

10. The computer-implemented method of claim 9, further comprising updating the content designated by the free form shape of the designation input when modifications are made to the clipboard content.

11. At least one computer-readable storage medium containing computer-executable instructions for causing a computer device to perform operations comprising:

displaying content in a first window on a display device;

receiving a designation input including a free form shape that designates a first portion of the content in the first window to be captured;

altering an appearance of a second portion of the content in the first window, the second portion of the content including content other than the content designated by the free form shape of the designation input, and the second portion of the content remaining visible after the appearance of the second portion of the content is altered; and displaying on the display device a new window in addition to the first window in response to receiving the designation input, the new window including the first portion of the content designated by the free form shape of the designation input and at least one menu option.

12. The at least one computer-readable storage medium of claim 11, wherein the operations further comprise providing a plurality of options corresponding to respective types of designation inputs adapted to capture the content of the first window.

13. The at least one computer-readable storage medium of claim 11, wherein the window includes a menu option for emailing the designated content.

14. A system comprising:
a display device;
a processing unit; and
a memory comprising computer storage media including instructions that when executed by the processing unit:

display content in a first window on the display device;

receive a designation input via the display device, the designation input including a free form shape that designates a first portion of the content to be captured; and in response to receiving the designation input, display a second window on the display device in addition to the first window, the second window including the first portion of the content and the first window including a second portion of the content surrounding the first portion of the content.

15. The system of claim 14, wherein the display device includes a touch-sensitive digitizing display surface.

16. the system of claim 14, wherein the display device includes a proximity-sensitive digitizing display surface.

17. The system of claim 14, wherein the computer storage media include instructions executable by the processing unit to cause a computing device to resize the second window when an annotation approaches an edge of the second window.

18. The system of claim 14, wherein the computer storage media include instructions executable by the processing unit to parse an annotation made to the first portion of the content and insert the annotation into a subject line of an email message.

19. The system of claim 14, wherein the computer storage media include instructions executable by the processing unit to insert a title of a webpage identified in the first portion of the content into a subject line of an email message.

* * * * *